May 4, 1948.    W. H. ATTSCHULER    2,440,766
REMOVABLE CLEANOUT CLOSURE
Filed Aug. 16, 1944
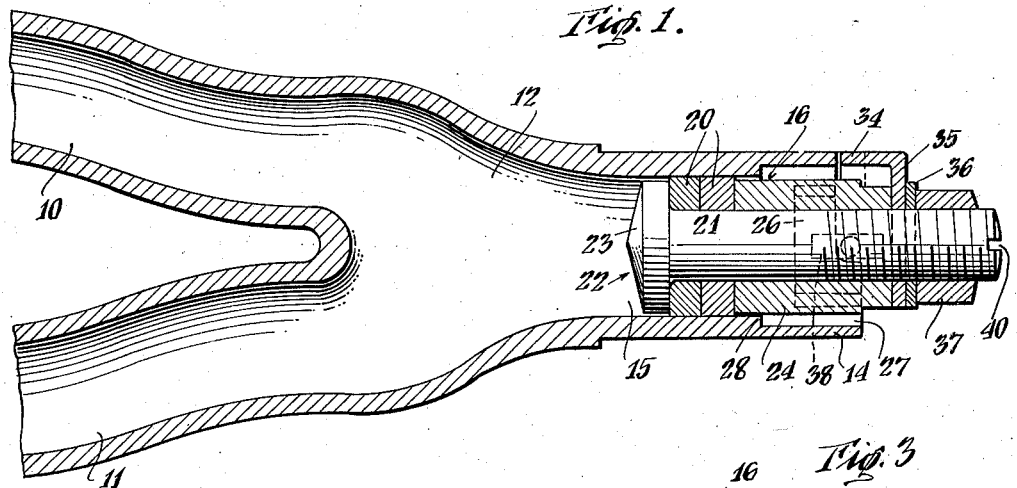
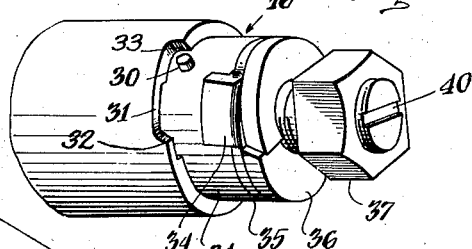
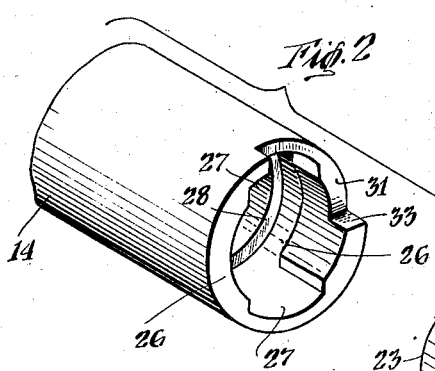
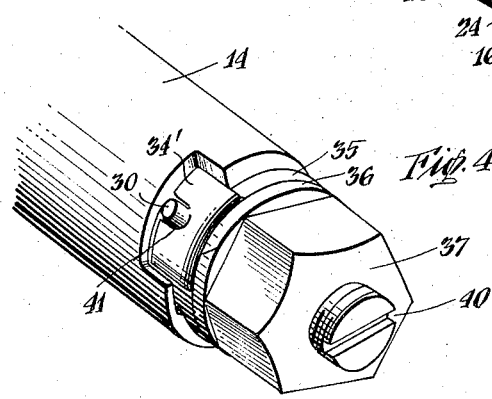
INVENTOR.
WILLIAM H. ATTSCHULER.
BY
ATTORNEY Patented May 4, 1948

2,440,766

UNITED STATES PATENT OFFICE 2,440,766

REMOVABLE CLEAN-OUT CLOSURE

William H. Attschuler, Chicago, Ill., assignor to The Superheater Company, New York, N. Y.

Application August 16, 1944, Serial No. 549,726

4 Claims. (Cl. 138—95)

The present invention relates to an improved cleanout closure for tubular fluid circulating conduits or the like.

Where heat transfer tubes are positioned in parallel relation and interconnected for series fluid flow by bends, as in economizers, it is desirable that access may be had to the interior of the tubes for cleaning them. Various types of removable closures have been provided for this purpose; the present invention relates to a cleanout closure in which the closure element and the parts that maintain it in place within the tubing are removable as a unit so that they may be kept together to avoid loss and assure ready replacement.

In the accompanying drawings:

Figure 1 is a longitudinal sectional view through parts of a pair of fluid circulating tubes interconnected by an integral breeches piece closed at its outer end by a cleanout plug embodying the present invention;

Figure 2 is an exploded perspective view showing the end of the breeches piece with the cleanout plug separated therefrom; and Figure 3 is a perspective view showing the closure during application to the breeches piece; and Figure 4 is a perspective view showing a modified form of cleanout closure.

In Figure 1 tubes 10 and 11 may be considered to represent two parallel pipes of an economizer or the like that are serially interconnected at one end by breeches piece 12. The annular body portion 14 at the end of the breeches piece has a bore 15 extending to its outer end in which the cleanout plug or closure 16 is located. The closure member 16 comprises pressure deformable sealing means 20 mounted on the steam 21 of a carrier 22 between the head 23 of the latter and a plug member 24 through which the stem 21 extends. The plug member 24 is held against withdrawal from the bore 15 of the annular body member 14 by a bayonet type lock comprising diametrically spaced lugs 25 engageable behind circumferentially spaced flanges 26 formed on the wall of bore 15 and separated by the recesses 27 through which the lugs 25 may pass in applying or withdrawing the plug member. A shoulder 28 engageable by the lugs 25 limits inward movement of the closure.

To prevent rotation of the plug member 16 it is provided with a stud 30 projecting therefrom into a notch 31 formed at the outer end of the body portion 14. The stud 30 is adapted to engage the end wall 33 of the notch and be held thereagainst by an ear-like lug 34 extending from a washer-like retainer 35 mounted on the stem 21 between the plug 24 and a spring washer 36. The outer end of the stem 21 is threaded to receive a nut 37 which not only serves to hold the retainer 35 and spring washer 36 in place but also acts to draw the head 23 towards the plug 16 so as to deform the sealing means 20 into sealing contact with the wall of the bore 15.

In applying cleanout closure 16 to the annular body portion 14 of economizer tubing all the parts of the closure are assembled on stem 21 as shown at the right hand part of Fig. 2, the lug 34 that projects from the retainer 35 being located at the right hand side of the stud 30. In introducing the closure member 16 into the annular body portion 14 the retainer lug 34 is retracted and the closure member 16 is held so that the stud 30 is disposed to slide along the end wall 32 of notch 31 in which position the bayonet lugs 25 on the plug member 24 are properly disposed to pass through the recesses 27 between the locking flanges 26 forming the complementary parts of the bayonet lock on the body member 14. The retainer lug 34 being in retracted position the closure member is rotated to bring the stud 30 into contact with the right hand wall 33 of the notch 31. The lug 34 on the retainer member 35 is then fitted into the notch 31 and disposed between the stud 30 and the left hand wall 32 of the slot thereby preventing rotation of the closure member. This rotary movement of the closure member also engages the lugs 25 behind the flanges 26 and prevents the plug being withdrawn axially so that when the nut 37 is tightened up traction may be exerted on the stem 21 in an axially outward direction for deforming the sealing means 20.

In the form shown in Fig. 4 the construction is the same as described above except that the lug 34' of the retainer member 35 is formed with a slot 41 to embrace the stud 30 projecting from the plug member 24 and thereby prevent rotation thereof.

The stud 30 extends into a short longitudinal keyway 38 in the stem 21 and prevents rotation thereof to insure axial movement of its head 23 for compressing the sealing means 20. Alternatively the end of stem 21 may be formed with a slot 40 for receiving a tool to prevent rotation of stem 21 as the nut 37 is turned.

What I claim is:

1. A removable cleanout closure for a fluid circulating element provided with an annular body portion having its wall cut away at its outer end to form a circumferentially extending notch communicating with the bore of said body; pressure deformable sealing means supported within the bore of said body; a plug member mounted in said bore outwardly of said sealing means; bayonet-type locking means on said body and plug for holding said plug against axial movement in said body; a stud projecting from said plug to occupy part of said body notch and engaging one end wall thereof; a stem projecting from said plug to a position beyond the outer end of said body; a retainer mounted on said stem outwardly of said plug; a lug on said retainer fitting in the notch intermediate said stud and the other end wall of said notch in engagement with the latter to prevent rotation of said plug; and means for holding said retainer in its locking position on said stem.

2. A removable closure for a fluid circulating element provided with an annular body portion having its wall cut away at its outer end to form a circumferentially extending notch; pressure deformable sealing means supported within the bore of said body; a plug member mounted in said bore outwardly of said sealing means; bayonet-type locking means on said body and plug for holding said plug against axial movement in said body; a stud projecting from said plug to occupy part of said body notch; a stem projecting from said plug to a position beyond the outer end of said body; a retainer mounted on said stem outwardly of said plug and having a lug extending into said notch to cooperate with said stud and a wall of said notch for preventing rotation of said plug; and means for holding said retainer in its locking position on said stem.

3. A removable closure for an element provided with an annular body portion, said closure having a carrier including a head disposed within the bore of said body and a stem projecting axially beyond the outer end of said body, deformable sealing means mounted on the stem of said carrier adjacent its head, a plug member cooperating with the head of said carrier to deform said sealing means into pressure-tight relationship with the bore wall of said body, said body being formed to provide circumferentially spaced locking flanges in said bore separated by intervening recesses, and lugs on said plug member engageable with said flanges to hold said plug against axial movement; said body being also formed with a circumferential notch at its outer end; a stud extending radially from said plug; a retainer mounted on said stem outwardly of said plug and having a lug extending into said notch and cooperating with said stud and an end wall of said notch to prevent rotation of said plug; and means for holding said retainer in its locking position on said stem.

4. A cleanout plug as recited in claim 2 wherein the lug on said retainer is formed to embrace the stud on said plug and engages opposite end walls of said notch.

WILLIAM H. ATTSCHULER.

REFERENCES CITED

The following references are of record in the file of this patent:

UNITED STATES PATENTS

| Number | Name | Date |
|---|---|---|
| 2,342,140 | Hamilton | Feb. 22, 1944 |